United States Patent

Novak et al.

[11] Patent Number: 5,926,841
[45] Date of Patent: Jul. 20, 1999

[54] SEGMENT DESCRIPTOR CACHE FOR A PROCESSOR

[75] Inventors: Stephen T. Novak, San Jose; Hong-Yi Chen, Fremont, both of Calif.

[73] Assignee: Advanced Micro Devices, Inc., Sunnyvale, Calif.

[21] Appl. No.: 08/614,728

[22] Filed: Mar. 13, 1996

[51] Int. Cl.⁶ .................................................. G06F 12/08
[52] U.S. Cl. ............................................ 711/208; 711/119
[58] Field of Search .................................. 711/203, 206, 711/208, 119

[56] References Cited

U.S. PATENT DOCUMENTS

| | | | |
|---|---|---|---|
| 4,669,043 | 5/1987 | Kaplinsky | 364/200 |
| 5,555,395 | 9/1996 | Parks | 395/472 |
| 5,638,382 | 6/1997 | Krick et al. | 371/22.5 |
| 5,652,872 | 7/1997 | Richter et al. | 395/500 |

FOREIGN PATENT DOCUMENTS

| | | |
|---|---|---|
| 0 557 908 A2 | 9/1993 | European Pat. Off. . |
| 2 260 630 | 4/1993 | United Kingdom . |

OTHER PUBLICATIONS

Crawford, John H., "The i486 CPU: Executing Instructions in One Clock Cycle," IEEE Micro, Feb. 1990, vol. 1

*Primary Examiner*—Eddie P. Chan
*Assistant Examiner*—Kevin Verbrugge
*Attorney, Agent, or Firm*—Fliesler, Dubb, Meyer & Lovejoy, LLP

[57] ABSTRACT

A microprocessor having a segment descriptor cache that holds data obtained from a segment descriptor table contained in an external memory and a separate data cache that holds data obtained from portions of the external memory other than the segment descriptor table.

18 Claims, 6 Drawing Sheets

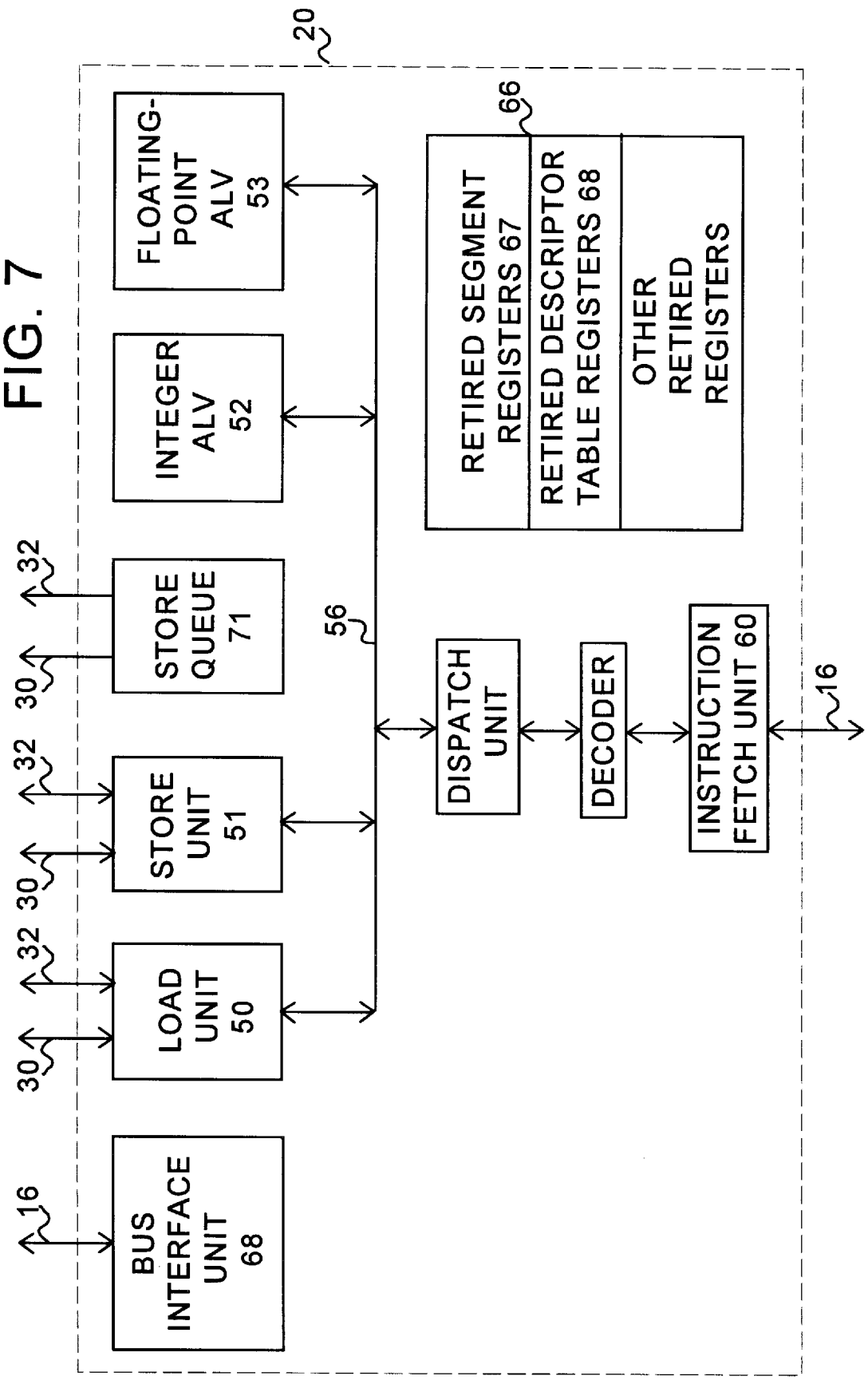

SEGMENT DESCRIPTOR CACHE FOR A PROCESSOR

BACKGROUND OF THE INVENTION

1. Field of Invention

The present invention pertains to the field of processors. More particularly, this invention relates to a processor having a cache of memory segment descriptors.

2. Art Background

Prior computer systems typically contain one or more processors along with other hardware subsystems such as memory and specialized peripheral hardware. Such processors commonly communicate with memory and peripheral hardware via an address bus and a corresponding data bus. Typically, individual memory locations are selected by addresses transferred via the address bus. The range of address selection available to such a processor may be referred to as the memory address space of the processor.

Some processors employ a segmented model of such a memory address space. For example, one type of processor having a segmented memory model may be referred to as an X86 processor or a processor that conforms to the X86 architecture. The native instruction code for such an X86 type of processor typically represents memory addresses as 16 bit values which may be referred to as logical addresses. On the other hand, later generations of the X86 architecture include a 32 bit memory address space. Such later generation X86 processors are capable of generating 32 bit physical addresses which may be referred to as linear addresses.

Typically, the memory address space for such an X86 processor is logically subdivided into a set of segments each having a 16 bit logical address range. Such an X86 processor usually contains a set of internal segment registers that contain segment descriptors. Each segment descriptor typically includes a 32 bit base address which is used by the processor to convert 16 bit logical addresses into 32 bit physical addresses. Each segment descriptor also usually includes segment limit values and a variety of attribute flags for the corresponding segment.

Typically, such an X86 processor maintains segment descriptors in a set segment descriptor tables located in an external memory. Such a processor usually reloads the internal segment registers under a variety of conditions as required by the operating system, the application programs, and other software elements of the system.

In addition, such an X86 processor commonly includes an internal data cache that reflects selected portions of external memory. Such an internal data cache typically enhances performance by providing low latency access to data stored in the internal data cache during load memory and store memory operations. Such an internal data cache may also be referred to as an L1 data cache. Prior X86 processors typically cache segment descriptors with other types of data in such an internal data cache.

Typically, the caching strategy for such an internal data cache is selected to optimize access to the types of data most often encountered by the processor. For example, such internal data caches are usually managed such that the data for the memory locations most recently accessed by the processor remain in the cache while the data for memory locations least recently accessed are evicted from the cache to external memory.

Unfortunately, such a caching strategy is typically not well suited for caching segment descriptors. For example, the rate of occurrence of load memory operations targeted for the segment descriptor tables is usually lower than the rate for other types of cached data. As a consequence, the segment descriptor targeted by a particular load memory operation is typically evicted from the data cache before the next load memory operation for that segment descriptor occurs. Therefore, such load memory operations targeted for segment descriptors typically miss the data cache and require an access to the segment tables located in the external memory.

Moreover, such an external memory access is typically much slower than an access to the internal data cache. Such high latency accesses to external memory typically slows the overall speed of such a processor during memory operations that require access to segment descriptors. In addition, such segment descriptors unnecessarily consume space in the data cache of prior processors while not providing the benefits normally associated with data caching.

SUMMARY AND OBJECTS OF THE INVENTION

One object of the present invention is to improve the performance of processor having a segmented memory architecture.

Another object of the present invention is to enhance the effectiveness of data caching in a computer system having a segmented memory architecture.

A further object of the present invention is to separate relatively static and infrequently accessed data into a separate internal cache in a processor.

Another object of the present invention is to provide an X86 microprocessor chip that includes a data cache and a separate segment descriptor cache.

These and other objects are provided by a processor that includes a segment descriptor cache that holds data obtained from a segment descriptor table contained in an external memory. The processor also includes a data cache that holds data obtained from portions of the external memory other than the segment descriptor table. A memory access unit in the processor executes a memory access instruction by performing a lookup operation on the segment descriptor cache if the memory access instruction involves a segment register in the processor and by performing a lookup operation on the data cache otherwise.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 7 illustrates a processor that implements a segmented memory model and that performs out-of-order instruction execution and speculative execution of instructions.

DETAILED DESCRIPTION

Figure 1:
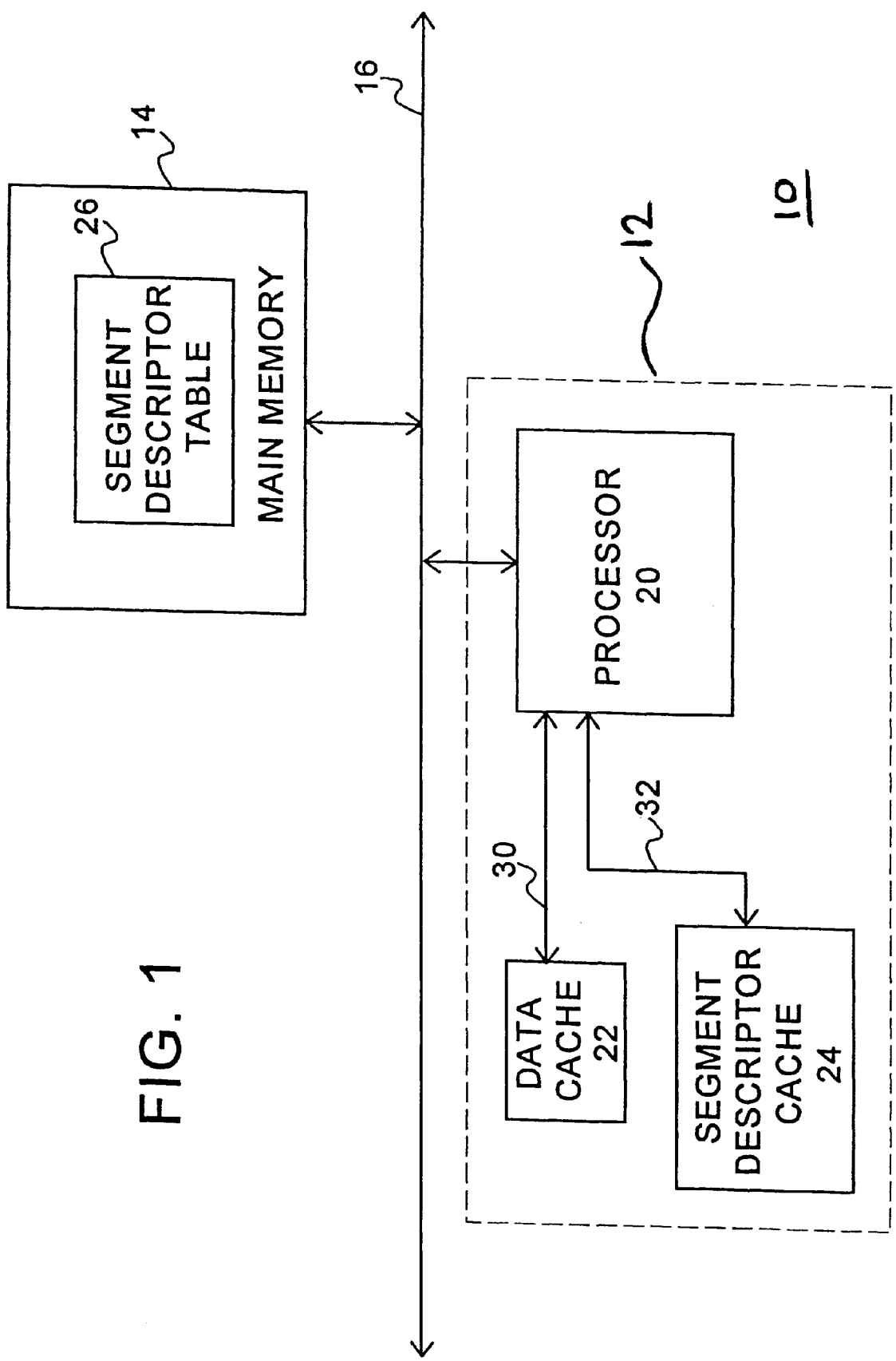
FIG. 1 illustrates portions of a computer system including a processor that employs a segmented memory model and that includes a cache for segment information.

FIG. 1 illustrates portions of a computer system 10 that employs a segmented memory model. The computer system 10 includes a processor subsystem 12 and a main memory 14. The processor subsystem 12 includes a processor 20, a data cache 22, and a segment descriptor cache 24. The processor 20 manages the segment descriptor cache 24 to provide low latency access to segmentation information stored external to the processor subsystem 12 in the main memory 14.

In one embodiment, the processor subsystem 12 including the processor 20, and the data and segment caches 22 and 24 are contained in a single integrated circuit chip package. The single integrated circuit chip package provides fast communication between the processor 20 and the caches 22 and 24 in comparison to the speed of communication between the processor 20 the main memory 14.

The processor subsystem 12 communicates with the main memory 14 via a processor bus 16. The processor subsystem 12 transfers addresses via an address portion of the processor bus 16 to select individual memory locations in the main memory 14. In one embodiment, the address portion of the processor bus 16 carries 32-bit addresses which are referred to as physical addresses or linear addresses.

The processor 20 implements a memory management architecture that models the main memory 14 as a set of memory segments. The processor 20 maintains a set of segment information in a segment descriptor table 26 contained the main memory 14. The segment information in the segment descriptor table 26 defines an arrangement of memory segments of the main memory 14 including base addresses and attributes of the individual memory segments. The segment information enables the processor 20 to translate internal logical addresses into physical addresses for transfer via the processor bus 16. The processor 20 caches the segment information of the segment descriptor table 26 in the segment descriptor cache 24 and caches data for the remainder of the main memory 14 in the data cache 22.

In one embodiment, the processor 20 conforms to the X86 processor architecture which is described in detail in a number of published specifications. According to the X86 memory segmentation model, the segmentation information in the segment description table 26 is arranged into a global descriptor table, a local descriptor table, and an interrupt descriptor table. The global, local, and interrupt descriptor tables each store a set of segment descriptors that provide parameters for segmented memory management in the computer system 10 including base addresses and attributes for individual segments.

In one embodiment, segment descriptors for the global, local, and interrupt descriptor tables are cached in the single segment descriptor cache 24. In another embodiment, segment descriptors from the global, local, and interrupt descriptor tables are cached in separate global, local, and interrupt segment descriptor caches in the processor subsystem 12.

The processor 20 contains a set of internal descriptor table registers that provide base physical addresses for the segment descriptor tables in the main memory 14. The descriptor table registers include a global descriptor table register that provides a base physical address of the global descriptor table, a local descriptor table register that provides a base physical address of the local descriptor table, and an interrupt descriptor table register that provides the base physical address of the interrupt descriptor table. The global, local, and interrupt descriptor tables may be stored in differing areas of the main memory 14 and may be stored in various types of storage media such as a disk drive in a system that employs memory paging.

The processor 20 contains a set of segment registers including a code segment register and a data segment register, along with other segment registers. A set of operating system code executed by the processor 20 loads the segment registers as required by operating system functions. For example, differing application programs or processes executed by the processor 20 may be allocated differing code segments and data segments within the main memory 14. The operating system loads the code and data segment registers in the processor 20 from the segment descriptor tables during context switches between such application programs and processes. A variety of other conditions may cause the processor 20 to load the code and data segment registers as well as other internal segment registers.

The X86 instructions that load the internal segment registers specify a particular segment descriptor using a segment selector. The segment selector provides an index into global, local, or interrupt descriptor table according to the context of the instruction. The processor 20 computes a physical address for the desired segment descriptor by multiplying the segment selector value by the byte length of a segment descriptor and adding the base address of the global, local, or interrupt descriptor table which are contained in the global descriptor table register, the local descriptor table register, and the interrupt descriptor table register, respectively. In a similar manner, the X86 instructions that store the internal segment registers specify a particular segment descriptor using a segment selector.

Each segment register in the processor 20 accommodates a segment descriptor according to the X86 segmented memory model. Each segment descriptor comprises 64 bits which includes a 32 bit base address of the corresponding segment, as well as attributes for the corresponding segment. The processor 20 obtains segment descriptors by generating load memory instructions that specify a physical address for the desired segment descriptor. The processor 20 stores segment descriptors by generating store memory instructions that specify a physical address for the desired destination of the segment descriptor.

The processor 20 uses the information contained in the code segment register to generate physical addresses for reading instructions during program execution. The processor 20 uses the information contained in the data segment register to generate physical addresses for loading data from memory and storing data to memory. The information in the other segment registers in the processor 20 enable a similar generation of physical addresses for a variety of addressing modes.

The processor 20 accesses the segment descriptor cache 24 via an address path 32. The processor 20 performs a lookup operation to the segment descriptor cache 24 in one embodiment by transferring a physical address and an address valid flag via the address path 32. Each entry in the segment descriptor cache provides 256 bits which can accommodate a block of 4 segment descriptors. The data for an entry in the segment descriptor cache 24 is referred to as a cache line or a data line. In one embodiment, the segment descriptor cache 24 is a direct mapped cache wherein each physical address maps to one cache entry. In other embodiments, other types of caches may be employed for the segment descriptor cache 24 including set associate caches.

If the cache line containing a desired segment descriptor is not contained in the segment descriptor cache 24, then the processor 20 fetches that cache line from the main memory 14 via the processor bus. Such a condition may be referred to as a cache miss, followed by a line fill operation. The processor 20 stores the missed cache line containing the desired segment descriptor into the segment descriptor cache 24 once retrieved from the main memory 14.

Figure 2:
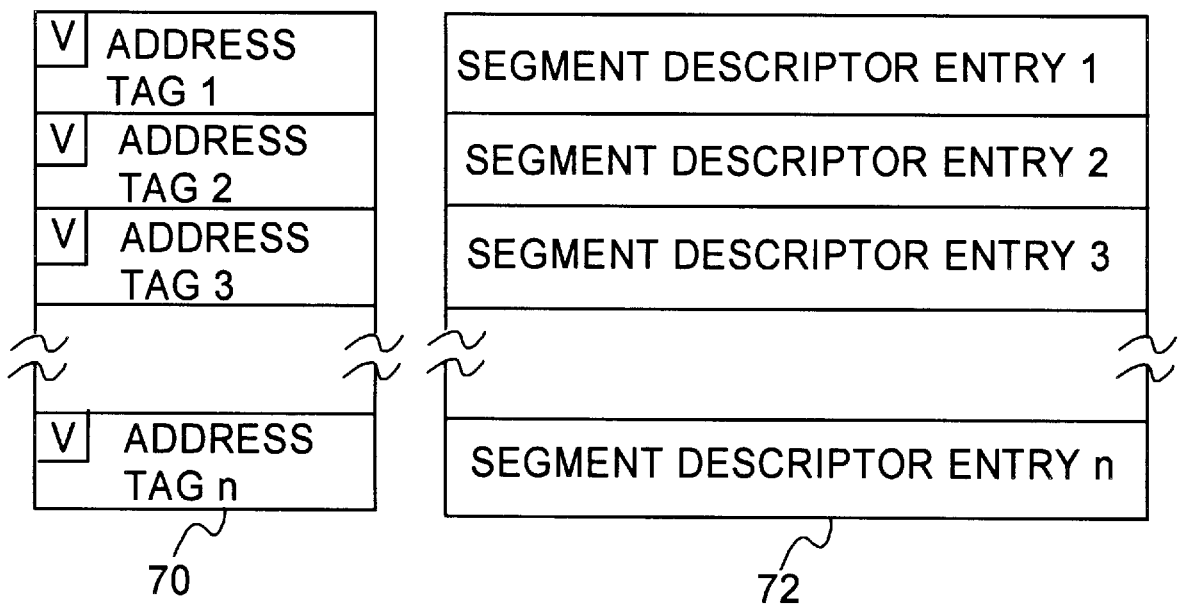
FIG. 2 illustrates the information contained in a segment descriptor cache in one embodiment.

FIG. 2 illustrates the information contained in the segment descriptor cache 24 in one embodiment. The segment descriptor cache 24 includes a tag array 70 and a data array 72. The data array 72 contains a set of segment descriptor entries 1–n. The tag array 70 contains a corresponding array of address tags 1n. Each address tag 1–n relates to a physical address of the corresponding segment descriptor entry 1–n. Each address tag 1–n also includes a valid (v) bit that indicates whether the corresponding segment descriptor entry 1–n in the data array 72 is valid.

In one embodiment, the processor 20 invalidates the segment descriptor entries 1–n whenever the entries in the data cache 22 are invalidated. Such invalidation may occur, for example, after a memory paging operation that swaps portions of the main memory 14 to a mass storage medium such as a disk drive (not shown). In another embodiment, the processor 20 implements a special instruction that enables the operating system for the computer system 20 to invalidate all of the segment descriptor entries 1–n.

In this embodiment, each address tag 1–n comprises bits 12–31 of the physical address of the corresponding segment descriptor entry 1–n. Each segment descriptor entry 1–n or segment descriptor cache line 1–n contains 256-bits which can accommodate 4 segment descriptors each having 64 bits.

Figure 3:
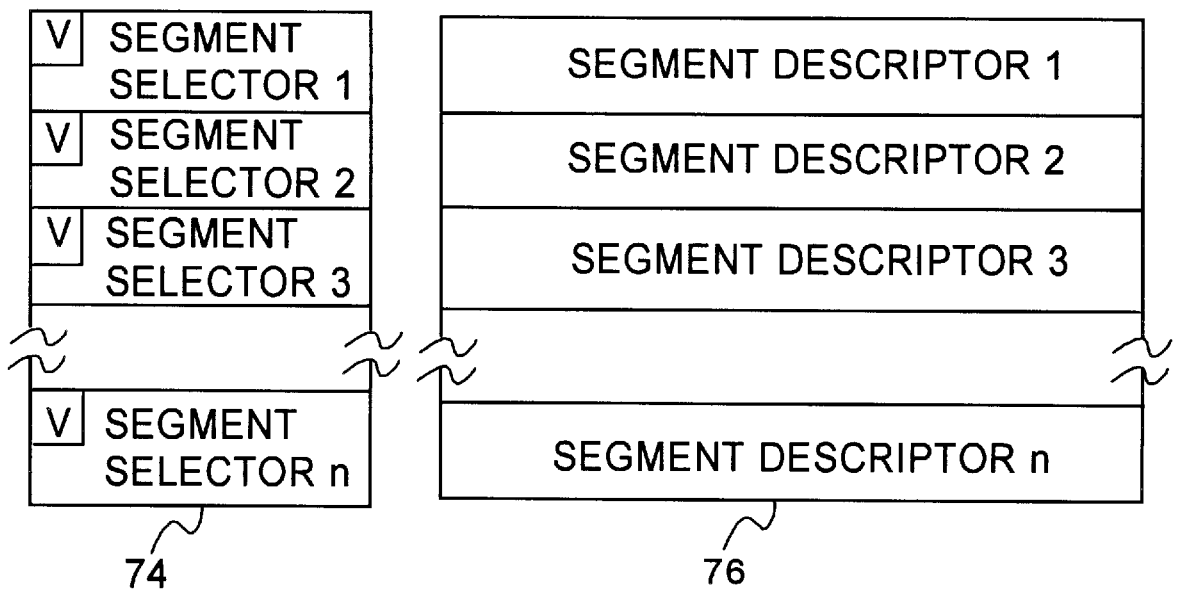
FIG. 3 illustrates another embodiment of the segment descriptor cache.

FIG. 3 illustrates another embodiment of the segment descriptor cache 24. In this embodiment, the segment descriptor cache 24 includes a tag array 74 and a data array 76. The data array 76 contains a set of segment descriptors 1–n. The tag array 74 contains a corresponding array of segment selectors 1–n. Each segment selector 1–n selects one of the corresponding segment descriptors 1–n. Each segment selector 1–n in the tag array 74 also includes a valid (v) bit that indicates whether the corresponding segment descriptor 1–n in the data array 76 is valid.

In this embodiment, each segment descriptor entry 1–n contains 64-bits which can accommodate one segment descriptor. The processor 20 performs a lookup operation to the segment descriptor cache 24 in this embodiment by transferring a segment selector and an address valid flag via the address path 32. The segment selector is obtained from the X86 instruction that accesses the segment register. This embodiment eliminates the need for the processor 20 to compute a physical address for the segment descriptors cached in the segment descriptor cache 24 which thereby enhances instruction execution performance during context switches. However, if a miss occurs to the segment descriptor cache 24 in this embodiment, then the processor 20 computes the physical address for the corresponding segment descriptor and performs the appropriate fetch to the main memory 14.

Figure 4:
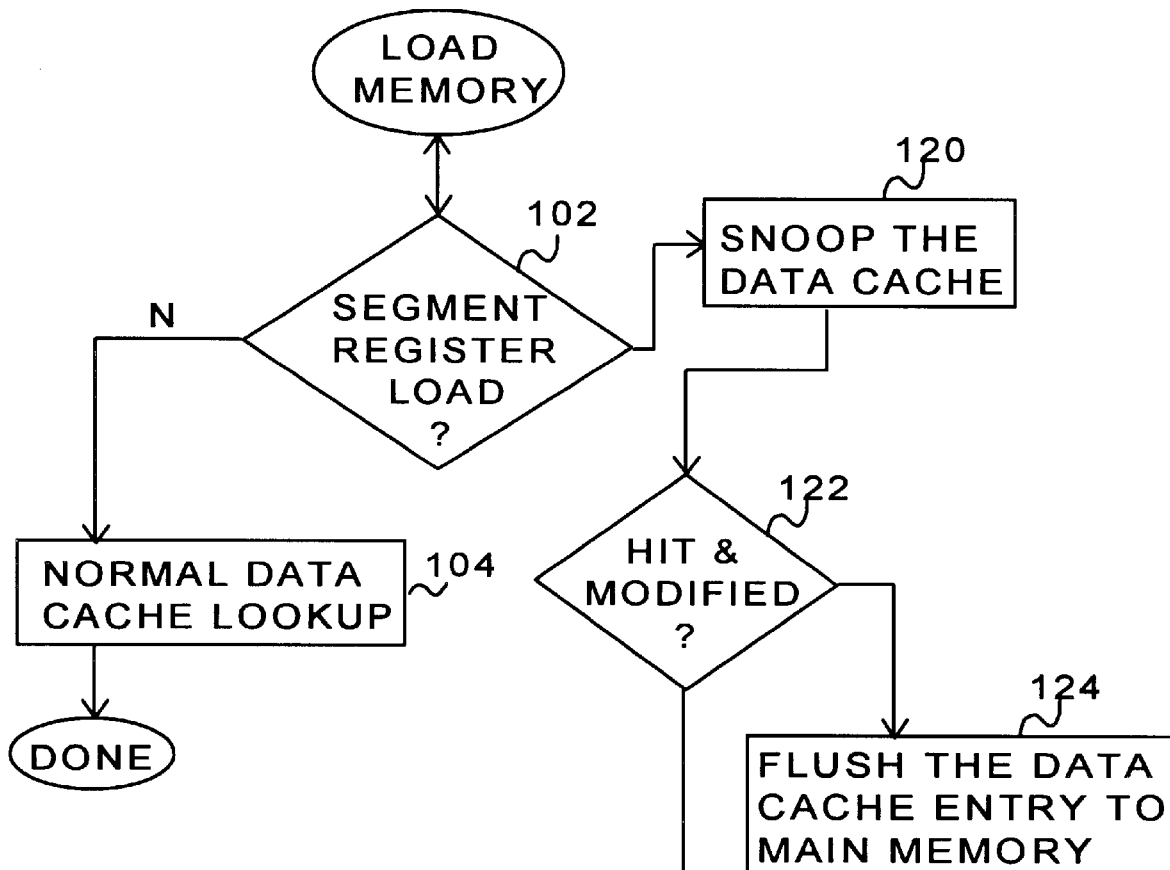
FIG. 4 illustrates the handling of a load memory operation by a processor having separate data and segment caches.
Figure 4:
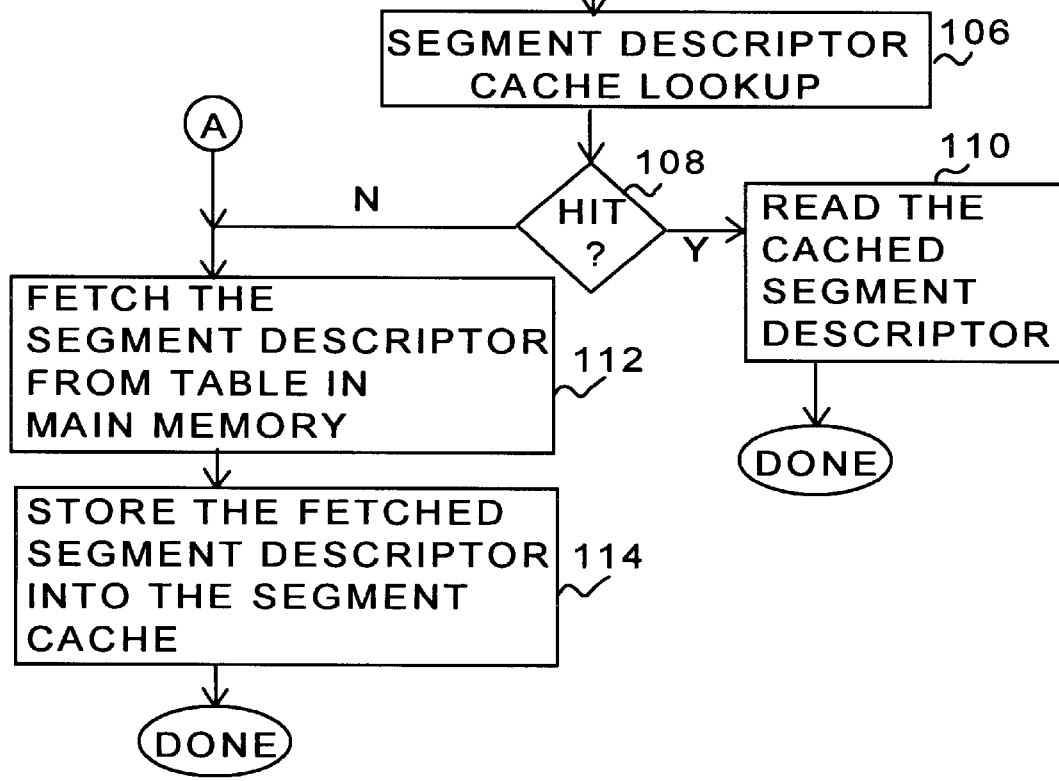

FIG. 4 illustrates a load memory operation by the processor 20 in one embodiment. At decision block 102, if the processor 20 determines that the load memory operation is a load of an internal segment register, then control proceeds to block 120. Otherwise, the processor 20 performs a normal data cache lookup to the data cache 22 for the load memory operation at block 104.

At block 120, the processor 20 performs a snoop operation on the data cache 22. The processor 20 performs a snoop operation on the data cache 22 by transferring the physical address of the segment register load operation to the data cache 22 via the address path 30. At decision block 122, if a cache hit occurs to the data cache 22 and if the segment register data is held in modified state in the data cache 22, then control proceeds to block 124. Otherwise, control proceeds to block 106.

At block 124, the processor 20 flushes the segment register data from the data cache 22 to the main memory 14. The processor 20 flushes segment register data from the data cache 22 so that the segment descriptor cache 24 will hold the up to date segment register data with no overlapping entries in the data cache 22. Control then proceeds to block 112 to retrieve the segment register data from the main memory 14. In another embodiment, at block 124 the processor 20 reads the cached segment descriptor from the data cache 22 and then internally loads the segment descriptor into the appropriate segment register before flushing the data cache 22.

At block 106, the processor 20 performs a lookup operation on the segment descriptor cache 24. In one embodiment, the processor 20 performs the lookup operation on the segment descriptor cache 24 by transferring the physical address for the load memory operation via the address path 32. In another embodiment, the processor 20 performs the lookup by transferring a segment selector via the address path 32 to the segment descriptor cache 24.

If a cache hit to the segment descriptor cache 24 occurs at decision block 108, then control proceeds to block 110. At block 110, the processor 20 reads the cached segment descriptor from the segment descriptor cache 24. Thereafter, the processor 20 internally loads the segment descriptor into the appropriate segment register.

If a cache miss to the segment descriptor cache 24 occurs at decision block 108, then control proceeds to block 112. At block 112, the processor 20 performs the load memory operation by fetching the missing cache line including the desire segment descriptor from the main memory 14. Thereafter at block 114, the processor 20 stores the fetched cache line including segment descriptor into an entry of the segment descriptor cache 24 and internally loads the appropriate segment register with the fetched segment descriptor.

Figure 5:
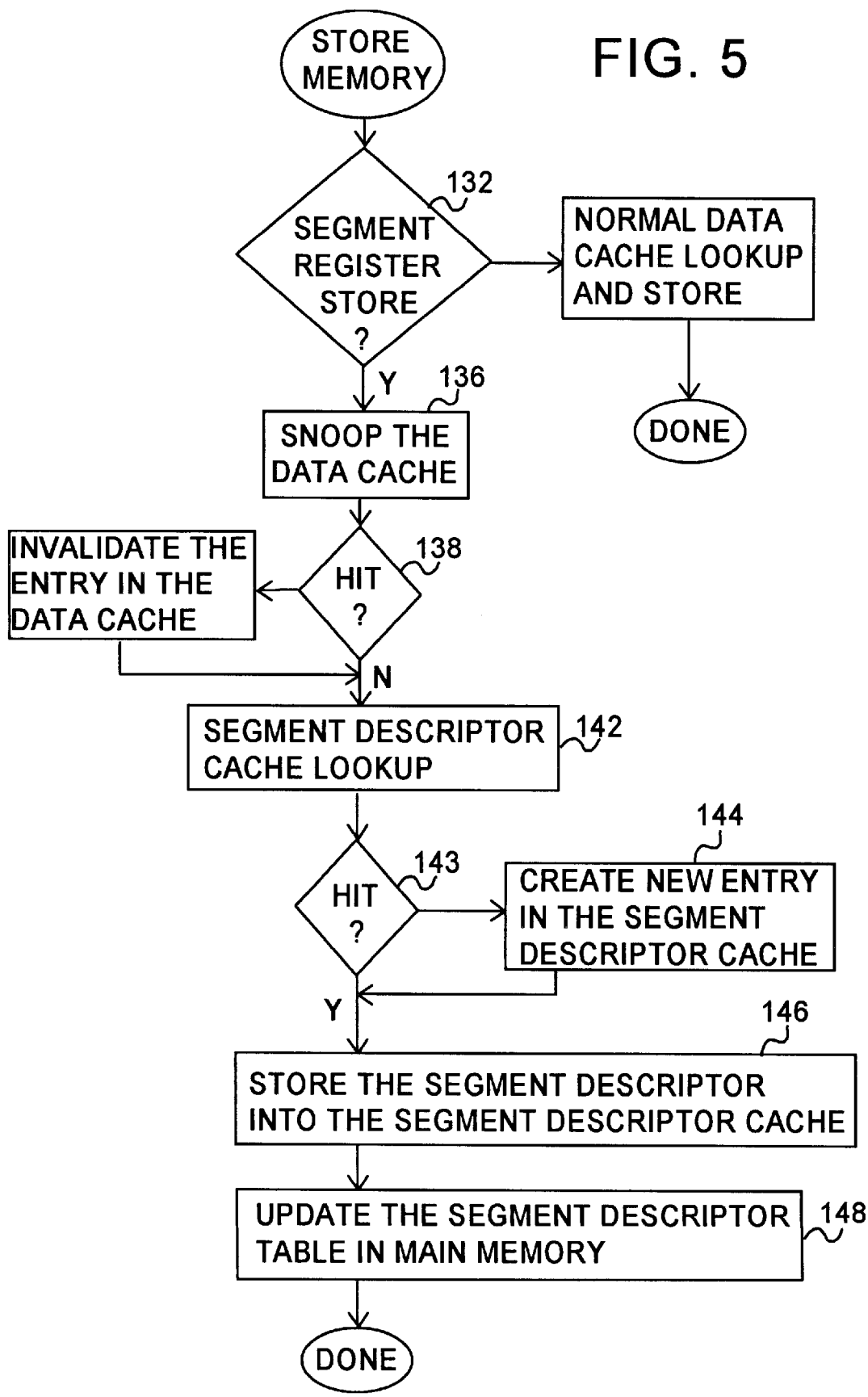
FIG. 5 illustrates the handling of a store memory operation by a processor having separate data and segment caches.

FIG. 5 illustrates the handling of a store memory operation by the processor 20 in one embodiment. At decision block 132, if the processor 20 determines that the store memory operation is a store from a segment register, then control proceeds to block 136. Otherwise, control proceeds to block 134 wherein the processor 20 performs a normal lookup and store operation on the data cache 22.

At block 136, the processor 20 performs a snoop operation on the data cache 22. The processor 20 performs a snoop operation on the data cache 22 by transferring the physical address of the segment register store operation to the data cache 22 via the address path 30. If a cache hit occurs to the data cache 22 at decision block 138, then control proceeds to block 140. At block 140, the processor 20 invalidates the entry in the data cache 22 that holds the data for the segment register store operation. The processor 20 invalidates the data cache 22 so that the segment descriptor cache 24 will hold the up to date segment register data with no overlapping entries in the data cache 22.

At block 142, the processor 20 performs a lookup operation on the segment descriptor cache 24. The processor 20 in one embodiment performs the lookup operation on the segment descriptor cache 24 by transferring the physical address for the store memory operation via the address path 32. In another embodiment, the processor 20 transfers a segment selector for the store segment register operation via the address path 32 to the segment descriptor cache 24.

If a cache miss occurs to the segment descriptor cache 24 at decision block 143, then control proceeds to block 144. At block 144, the processor 20 creates a new entry for the segment register store operation in the segment descriptor cache 24. Control then proceeds to block 146.

If a hit occurs to the segment descriptor cache 24 at decision block 143, then control proceeds to block 146 to update the segment descriptor cache 24 and the segment descriptor table 26 in the main memory 14.

At block 146, the processor 20 stores the segment descriptor for the segment register store operation into the entry of the segment descriptor cache 24. In one embodiment, the segment descriptor cache 24 is managed according to a write through policy to the memory subsystem 14. Thereafter at block 148, the processor 20 updates the appropriate entry in the segment descriptor table 26 of the main memory 14.

Figure 6:
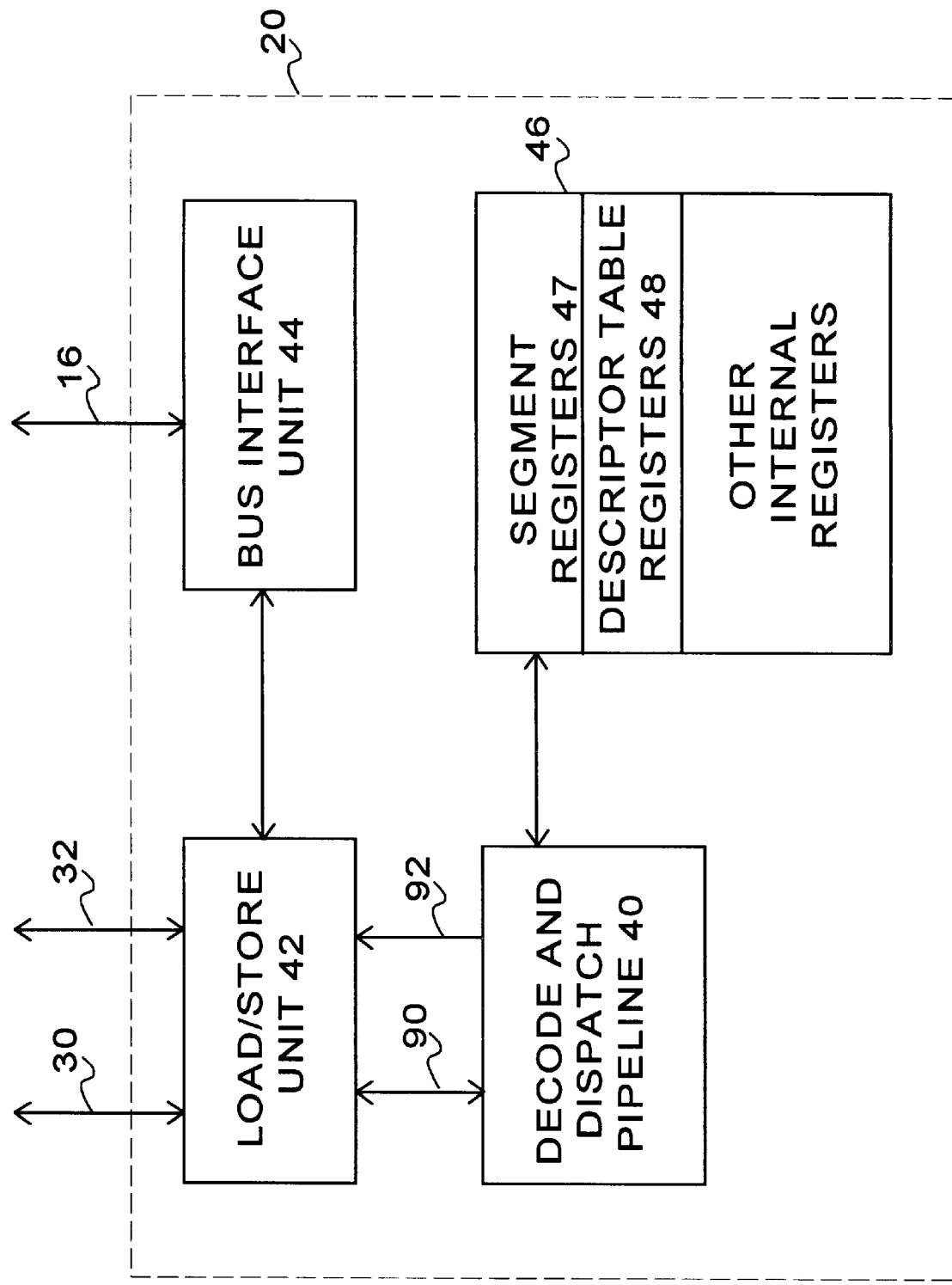
FIG. 6 illustrates portions of a processor that implements a segmented memory model and that implements an in-order decode and dispatch pipeline.

FIG. 6 illustrates portions of one embodiment of the processor 20 which implements an in-order decode and dispatch pipeline 40. The decode and dispatch pipeline 40 fetches instructions from the main memory 14 and executes the instructions in sequential program order. The processor 20 includes a set of internal registers 46. The internal registers 46 include a set of segment registers 47 that hold segment descriptors and a set of descriptor table registers 48 that specify base addresses of segment descriptor tables contained in the main memory 14 according to the segmented memory model of an X86 processor.

The decode and dispatch pipeline 40 decodes X86 instructions including MOV instructions that involve the segment registers 47. The X86 instructions are decoded into micro-instructions that include load memory and store memory micro-instructions. The decode and dispatch pipeline 40 computes physical addresses for load and store memory micro-instructions that involve the segment registers 47 by reading the appropriate one of the descriptor table registers 48 to obtain a base physical address for the descriptor table. The segment selector specified in the MOV segment register instructions is multiplied by 8 and added to the base physical address of the descriptor table which yields the physical address for the load or store micro-instruction.

The decode and dispatch pipeline 40 dispatches load memory micro-instructions and store memory micro-instructions to a load/store unit 42 via a dispatch bus 90. The decode and dispatch pipeline 40 also provides a flag 92 to the load/store unit 42. The flag 92 indicates whether the physical memory address on the dispatch bus 90 with the load or store micro-instruction corresponds to one of the segment registers 47.

The load/store unit 42 performs a lookup operation to the data cache 22 via the address path 30 if the flag 92 indicates that the physical memory address on the dispatch bus 90 does not correspond to one of the segment registers 47. Otherwise, the load/store unit 42 performs a lookup operation to the segment descriptor cache 24 via the address path 32. If a miss occurs to either the data cache 22 or the segment descriptor cache 24 then the load/store unit 42 accesses the main memory 14 through a bus interface unit 44. The load/store unit 42 stores cache lines returned via the bus interface unit 44 into the segment descriptor cache 24 for cache lines that contain segment descriptors for the segmentation registers 47. Otherwise, the load/store unit 42 stores the returned cache lines into the data cache 22.

FIG. 7 illustrates another embodiment of the processor 20 which includes a dispatch unit 64 that enables out-of-order instruction execution and speculative execution of instructions. The processor 20 in this embodiment includes a set of instruction execution units including a load unit 50, a store unit 51, an integer arithmetic logic unit (ALU) 52, and a floating point ALU 53. The load unit 50 performs load memory operations and the store unit 51 performs store memory operations.

The processor 20 includes an instruction fetch unit 60 that speculatively fetches instructions from the main memory 14. In one embodiment, the instruction fetch unit 60 includes an internal instruction cache for X86 instructions speculatively prefetched from the main memory 14 according to branch predictions. The speculatively fetched instructions are decoded by a decoder 62 wherein each X86 instructions is translated into one or more micro-instructions. The micro-instructions are then transferred to the dispatch unit 64.

The decoder 62 decodes X86 instructions including MOV instructions that involve the segment registers. Each MOV instruction that involves a segment register as a source or destination is decoded into a set of micro-instructions including a load segment register micro-instruction or a store segment register micro-instruction. The other micro-instructions for a MOV segment register operation include micro-instructions that compute physical addresses for load and store segment register micro-instructions. Such micro-instructions include micro-instructions that read the descriptor table registers to obtain base physical addresses for the descriptor tables and micro-instructions that index the descriptor tables according to the specified segment selectors in the MOV segment register instruction.

The dispatch unit 64 contains a set of entries for buffering micro-instructions. The dispatch unit 64 reads operands for the buffered micro-instructions, schedules the buffered micro-instructions, and dispatches the buffered micro-instructions via a dispatch bus 56 according to the availability of the execution units 50–53 rather than the sequential program order of the buffered micro-instructions. The dispatch unit 64 receives speculative results from the executed micro-instructions via the dispatch bus 56. The dispatch unit 64 includes result registers from storing the speculative results of the executed micro code instructions.

The dispatch unit 64 transfers results from the result registers to a set of retired registers 66 after all exceptional conditions for the micro-instructions are resolved. Such exceptional conditions include branch mispredictions and illegal operations as well as software traps. The retired register 66 include a set of retired segment registers 67 and a set of retired descriptor table registers 68.

The dispatch unit 64 dispatches load segment register micro-instructions to the load unit 50 via the dispatch bus 56. The load unit 50 performs a lookup operation to the segment descriptor cache 24 via the address path 32. If a miss occurs to segment descriptor cache 24, then the load unit 50 accesses the main memory 14 through a bus interface unit 68. The load unit 50 stores cache lines returned via the bus interface unit 68 into the segment descriptor cache 24 for cache lines that contain segment descriptors while transferring the segment descriptor to the dispatch unit 64. Thereafter, the returned segment descriptor is transferred from a result register in the dispatch unit 64 to the retired segment registers 67.

The dispatch unit 64 dispatches store segment register micro-instructions to the store unit 51 via the dispatch bus 56. The store unit 51 executes a store segment register micro-instructions by performing a cache lookup into the segment descriptor cache 24 and the data cache 22. If a cache hit occurs to either the data cache 22 or the segment descriptor cache 24, the store unit 51 writes the store segment register micro-instruction into a store queue 71 rather than directly into the data cache 22 or the segment descriptor cache 24. The store micro-instructions in the store queue 71 are transferred to the data cache 22 or the segment descriptor cache 24 once the results of the corresponding micro-instruction are transferred to the retired registers 66.

The processor 20 maintains a flag that enables/disables the segment descriptor cache 24 which provides backward compatibility with the processor 20. If the flag disables the segment descriptor cache 24 then the processor 20 treats segment register load and store operations the same as normal data load and store operations by accessing the data cache 22. In one embodiment, the flag that enables/disables the segment descriptor cache 24 is bit 0 of the control register CR5 of the processor 20.

The foregoing detailed description of the present invention is provided for the purposes of illustration and is not intended to be exhaustive or to limit the invention to the precise embodiment disclosed. Accordingly, the scope of the present invention is defined by the appended claims.

We claim:

1. An integrated circuit chip comprising:
   a processor configured to access a segment descriptor table and having a set of internal descriptor table registers for holding base physical registers for at least each of global, local, and interrupt descriptor tables maintained in said segment descriptor table;
   a global segment descriptor cache configured to store recently used global segment descriptors;
   a local segment descriptor cache configured to store recently used local segment descriptors;
   an interrupt segment descriptor cache configured to store recently used interrupt segment descriptors;
   a data cache configured to hold data other than that obtained from the segment descriptor table;
   wherein said global, local, and interrupt descriptor caches, and said data cache are each maintained in logically separate memories.

2. The integrated circuit chip according to claim 1, wherein said global, local, and interrupt descriptor caches are maintained in at least one memory device physically separate from said data cache.

3. The integrated circuit chip according to claim 1, wherein at least one of the segment descriptor caches is a direct mapped cache.

4. The integrated circuit chip according to claim 1, wherein at least one of the segment descriptor caches is a set associative cache.

5. The integrated circuit chip according to claim 1, wherein the processor maintains at least one of the segment descriptor caches according to a write-through policy.

6. The integrated circuit chip according to claim 1, wherein the segment descriptor table contains a plurality segment descriptors each enabling the processor to convert a logical address into a physical address.

7. The integrated circuit chip according to claim 6, wherein at least one of the segment descriptor caches comprises a data array for storing the segment descriptors and a tag array for storing a physical address tag for each segment descriptor in the data array.

8. The integrated circuit chip according to claim 6, wherein at least one of the segment descriptor caches comprises a data array for storing the segment descriptors and a tag array for storing a segment selector tag for each segment descriptor in the data array.

9. The integrated circuit chip according to claim 1, wherein the processor performs a load memory operation that specifies a physical address within the segment descriptor table by performing a lookup operation on at least one of the segment descriptor caches.

10. The integrated circuit chip according to claim 1, wherein the processor performs a store memory operation that specifies a physical address within the segment descriptor table by performing a lookup operation on at least one of the segment descriptor caches and by snooping the data cache and invalidating any data cache entry corresponding to the physical address.

11. The integrated circuit chip according to claim 1, further comprising:
   a memory access unit that executes a memory access instruction by performing a lookup operation on at least one of the segment descriptor caches if the memory access instruction is targeted for a segment register in the microprocessor and by performing a lookup operation on the data cache otherwise:
   wherein the segment descriptor table contains a plurality of segment descriptors each enabling the microprocessor to convert a logical address into a physical address.

12. The integrated circuit chip according to claim 11, wherein at least one of the segment descriptor caches comprises a data array for storing the segment descriptors and a tag array for storing a physical address tag for each segment descriptor in the data array.

13. The integrated circuit chip according to claim 11, wherein at least one of the segment descriptor caches comprises a data array for storing the segment descriptors and a tag array for storing a segment selector tag for each segment descriptor in the data array.

14. The integrated circuit chip according to claim 11, wherein the memory access instruction comprises a load memory instruction targeted for one of the segment descriptors such that the memory access unit performs the lookup operation on at least one of the segment descriptor caches and then reads the segment descriptor table if the lookup operation misses the segment descriptor cache.

15. The integrated circuit chip according to claim 11, wherein the memory access instruction comprises a store memory instruction targeted for one of the segment descriptors such that the memory access unit performs the lookup operation on at least one of the segment descriptor cache and snoops the data cache and invalidates any data cache entry targeted by the store memory instruction.

16. The integrated circuit chip according to claim 11, further comprising a control register with a flag for enabling and disabling the segment descriptor cache.

17. A method of loading memory utilizing an integrated memory chip having a main memory including a segment descriptor table, a processor with an X86 architecture, a segment descriptor cache, and a data cache logically separate from said segment descriptor cache and only holding data other than from the segment descriptor table, comprising the steps of:
   identifying a load operation for an internal segment register;
   performing a snoop operation on the data cache by transferring a physical address of the load operation to the data cache;

transferring, to the main memory, a data cache entry corresponding to the physical address of the load operation if the snoop operation results in a hit and corresponding segment register data is held in a modified state in the segment descriptor cache;

performing a look up operation on the segment descriptor cache if the data cache entry is not transferred to main memory;

reading a cached segment descriptor corresponding to the lookup operation if the lookup operation results in a hit; and fetching a segment descriptor corresponding to one of the data transferred from the main memory if either one of the lookup operation does not result in a hit and the data cache entry was transferred to main memory, and storing the fetched segment descriptor in the segment descriptor cache.

18. The method according to claim 17, wherein:

said segment descriptor cache is logically divided into, a global segment descriptor cache configured to store recently used global segment descriptors;

a local segment descriptor cache configured to store recently used local segment descriptors; and an interrupt segment descriptor cache configured to store recently used interrupt segment descriptors.

* * * * *